(12) United States Patent
Massey

(10) Patent No.: US 9,051,778 B2
(45) Date of Patent: Jun. 9, 2015

(54) LINEAL CONNECTOR AND TEMPLATE

(75) Inventor: Victor Massey, Orting, WA (US)

(73) Assignee: Milgard Manufacturing Incorporated, Tacoma, WA (US)

( * ) Notice: Subject to any disclaimer, the term of this patent is extended or adjusted under 35 U.S.C. 154(b) by 0 days.

(21) Appl. No.: 13/602,613

(22) Filed: Sep. 4, 2012

(65) Prior Publication Data

US 2014/0064844 A1 Mar. 6, 2014

(51) Int. Cl.
*E06B 3/96* (2006.01)
*E06B 3/968* (2006.01)
*E06B 3/964* (2006.01)

(52) U.S. Cl.
CPC ........... *E06B 3/9684* (2013.01); *Y10T 403/725* (2013.01); *E06B 3/9641* (2013.01); *E06B 3/9642* (2013.01)

(58) Field of Classification Search
USPC ........ 403/205, 295, 402, 13; 52/656.9, 586.4, 52/655.1
See application file for complete search history.

(56) References Cited

U.S. PATENT DOCUMENTS

| | | | | |
|---|---|---|---|---|
| 1,430,809 | A * | 10/1922 | Ilseng | 403/24 |
| 3,818,672 | A * | 6/1974 | Moore, Sr. | 403/295 |
| 4,065,900 | A | 1/1978 | Eggert | |
| 5,547,011 | A | 8/1996 | Dotson et al. | |
| 5,918,392 | A * | 7/1999 | Bates | 38/102.1 |
| 6,018,923 | A * | 2/2000 | Wendt | 52/712 |
| 6,112,463 | A | 9/2000 | Reithmeyer et al. | |
| 6,813,862 | B2 * | 11/2004 | Perich et al. | 49/425 |
| 7,223,044 | B2 * | 5/2007 | Quintile | 403/402 |
| 2002/0029533 | A1 | 3/2002 | Davidsaver | |
| 2003/0000169 | A1 | 1/2003 | Davidsaver | |
| 2008/0174114 | A1 * | 7/2008 | Reitano | 285/424 |
| 2009/0003928 | A1 * | 1/2009 | Ohrstrom | 403/205 |
| 2013/0051902 | A1 * | 2/2013 | Kelley et al. | 403/205 |
| 2013/0272777 | A1 * | 10/2013 | Hayter et al. | 403/205 |
| 2015/0020472 | A1 * | 1/2015 | Kelley et al. | 52/656.9 |

FOREIGN PATENT DOCUMENTS

DE 3107997 A 9/1982
EP 470601 A 2/1992

* cited by examiner

*Primary Examiner* — Joshua Kennedy
(74) *Attorney, Agent, or Firm* — Rathe Lindenbaum LLP

(57) ABSTRACT

A member is adapted to be used for forming at least one assembly opening in a first lineal, wherein the member provides a template for locating the at least one assembly opening. The members further adapted to be used to connect the first lineal to a second lineal using the member and the at least one assembly opening.

9 Claims, 18 Drawing Sheets

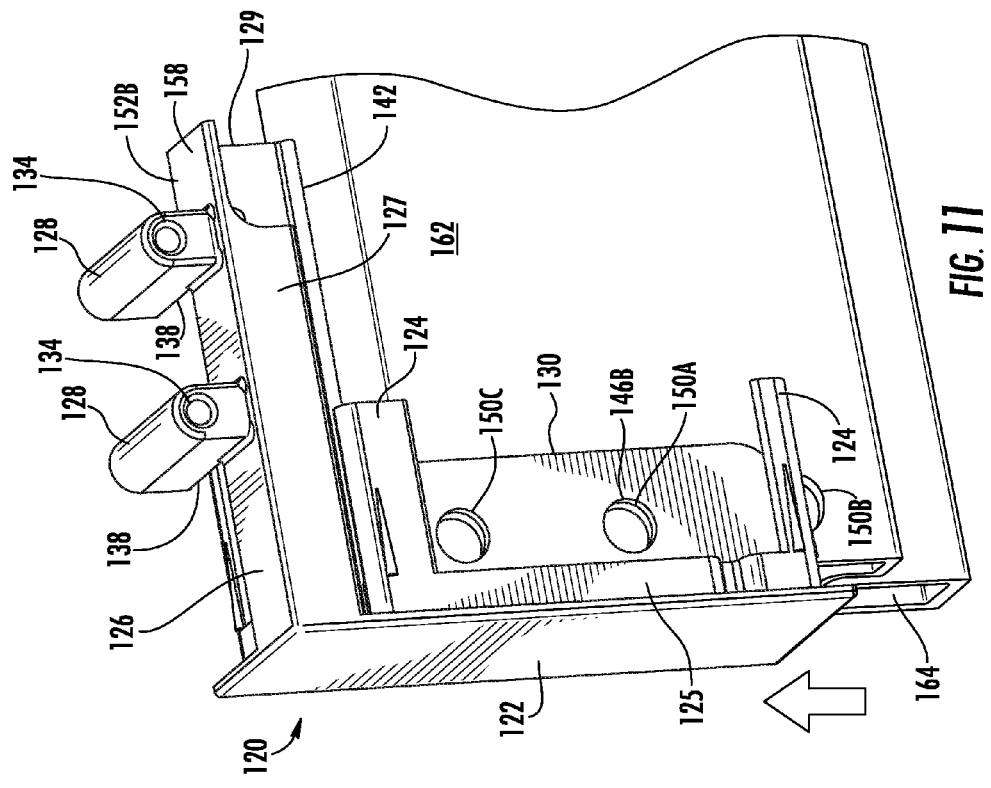
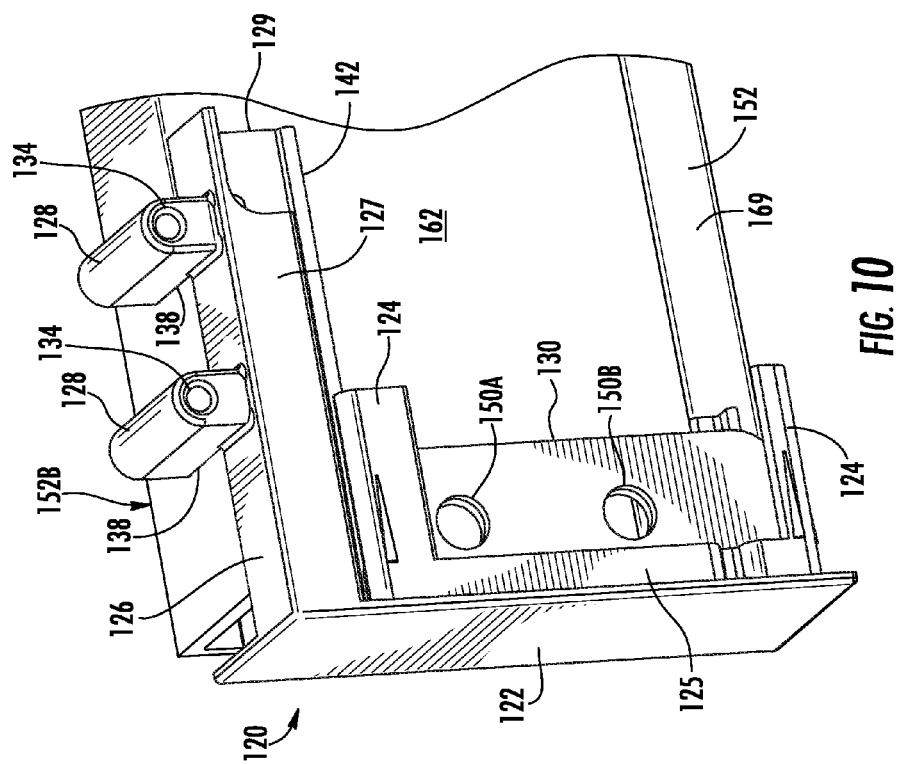

US 9,051,778 B2

LINEAL CONNECTOR AND TEMPLATE

BACKGROUND

Windows and doors are often surrounded by a frame formed from assembled lineals. Assembling the lineals to form the frame can be tedious and time-consuming, frequently requiring an installer to fabricate parts after the window/door and associated frame leaves the factory. Such fabrication may involve forming holes in the lineals for interconnection of the lineals. Unfortunately, accurately locating such holes in the field may be extremely difficult.

BRIEF DESCRIPTION OF THE DRAWINGS

FIG. 10 is a perspective view illustrating formation of a first set of example assembly openings in an example lineal using the lineal connector and template of FIG. 7.

FIG. 11 is a perspective view illustrating formation of a second set of example assembly openings in an example lineal using the lineal connector and template of FIG. 7.

DETAILED DESCRIPTION OF THE EXAMPLE EMBODIMENTS

Figure 1:
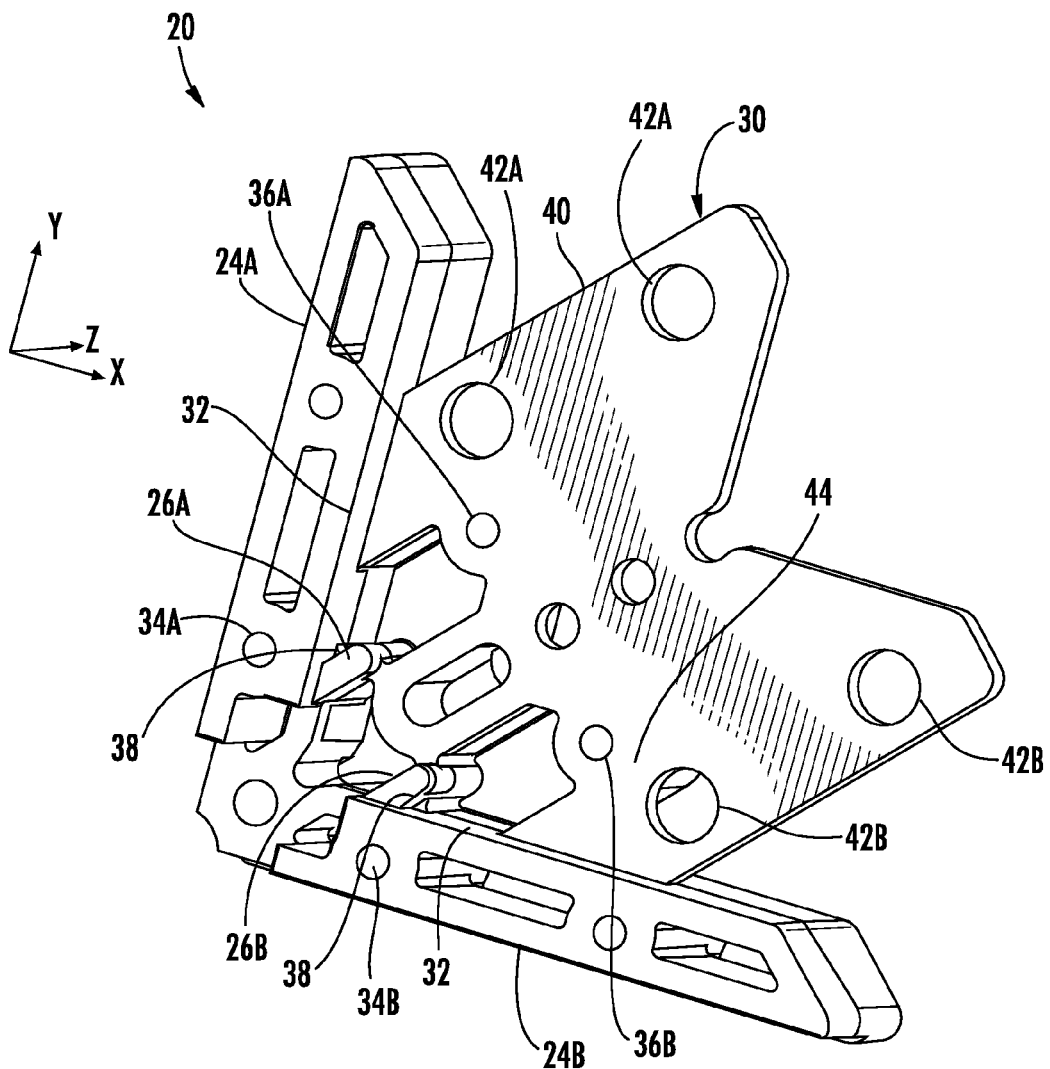
FIG. 1 is a first perspective view of an example lineal connector and template.

FIGS. 1-4 illustrate an example template and connector member 20 that serves the dual purpose of (1) a template for forming holes in lineal and (2) a connector or key for aligning and joining two lineals as part of a frame. Member 20 comprises legs 24A, 24B (collectively referred to as legs 24), locator extensions 26A, 26B (collectively referred to as locator extensions 26), template portion 30 and connecting structures 34, 36. Legs 24 comprise bars, rods, or other structures extending from and relative to one another so as to be concurrently received within the lineals being connected to one another at a corner of a frame. In the example illustrated, legs 24 extend at an angle of 90 degrees with respect to one another to receive two lineal that extend from one another at an angle of 90 degrees, forming a corner of a square or rectangular frame.

Each of legs 24 includes a datum surface 32 and one or more of connecting structures 34A, 34B (collectively referred to as connecting structures 34). Datum surfaces 32 extend along a face of legs 24. Datum surface 32 of leg 24B is located to abut or contact a surface of a lineal to facilitate appropriate alignment of the lineal with respect to template portion 30 in the negative Y axis direction. Datum surface 32 of leg 24A is located to abut or contact a surface of a lineal to facilitate appropriate alignment of the lineal with respect to template portion 30 in the negative X axis direction.

Connecting structures 34 comprise one or more structures, wherein each structure is configured to interact with a corresponding assembly opening in the lineal to facilitate connection of member 20 to the lineal. The corresponding assembly opening interacted upon by each connecting structure 34 is an opening that was located using template portion 30 of the same member 20 or another identical member 20. In the illustrated example implementation, each connection structure 34 comprised a bore at least partially into, if not through, the corresponding leg 24 of member 20. In the example illustrated, each bore, serving as the connecting structure 34, is configured to receive the end of a screw fastener that also extends through the corresponding assembly opening in the lineal.

In other implementations, each connecting structure 34 may have other configurations allowing the connecting structure 34 to interact with the formed assembly opening in the lineal in other fashions. For example, instead of comprising a detent for receiving a fastener that extends through the corresponding assembly opening, each connecting structure may alternatively comprise a projection integrally formed as part of a single unitary body with leg 24, wherein the projection is received with the assembly opening to facilitate connection of the member 20 to the lineal. In one implementation, the projection may resiliently flex during insertion of member 20 into the lineal, wherein the projection, once positions across the assembly opening, flexes back outward into the assembly opening to secure the member 20 to the lineal. In one implementation, the projection may have a multi-furcated head (i.e. a bifurcated head or a head having more than two portions that flex towards one another) that resiliently flexes during insertion through the assembly opening to snap into connection with a neck of the projection received within the assembly opening and captured in place by the head that has passed through the assembly opening.

In the example illustrated, each leg 24 is provided with one connection structure 34. In other implementations, each leg 24 may be provided with a greater number of such connecting structures 34. In some implementations, legs 24 may include a diversity of connecting structure configurations on the same member 24.

Locator extensions 26 comprise structures extending from legs 24 and providing datum surfaces 38. Datum surfaces 38 are located to abut or contact a surface of a lineal to facilitate appropriate alignment of the lineal with respect to template portion 30. As seen in FIG. 1, surface 38 of leg 24B facilitates such alignment in the negative X axis direction while surface 38 of leg 24A facilitates such alignment in the negative Y axis direction. In the example illustrated, datum surfaces 38 are oblique with respect to an opposite datum surface 32 to form an acute angle such that surfaces 38 of leg 24B also abut or contact a surface of a lineal to facilitate appropriate alignment of the lineal with respect to template portion 30 in the positive Y axis direction while surfaces 38 of leg 24A also facilitate alignment in the positive X axis direction. In other implementations, surfaces 38 alternatively form an obtuse angle with respect to the opposite surface 32 or form a right angle with the adjacent surface 32 such that each surface 38 of leg 24B only facilitates alignment of the lineal with respect to template 30 in one direction. Although extensions 26 are illustrated as extending from legs 24, in other implementations, extensions 26 may alternatively extend from a side of template portion 30.

Template portion 30 comprises a structure providing a template for forming at least one assembly opening in a lineal, wherein the assembly opening located by portion 30 facilitates connection to the member 20. In the example illustrated, template portion 30 is integrally formed as a single unitary body with legs 24 and extends between legs 24. Template portion 30 is sized and located so as to be entirely received with and concealed by the two lineal joined to one another by the member 20 that includes template portion 30.

In the example implementation, template portion 30 comprises a flat panel 40 and template openings 42A, 42B (collectively referred to as template openings 42). Panel 40 extends at a 45 degree angle symmetrically between legs 24. Panel 40 has a side surface 44 that also serves as a datum surface locating a lineal with respect to member 20 in the positive Z axis direction, facilitating alignment of openings 42 in the Z axis. In some implementations, surfaces 44 serving as a datum surface may be omitted.

Figure 2:
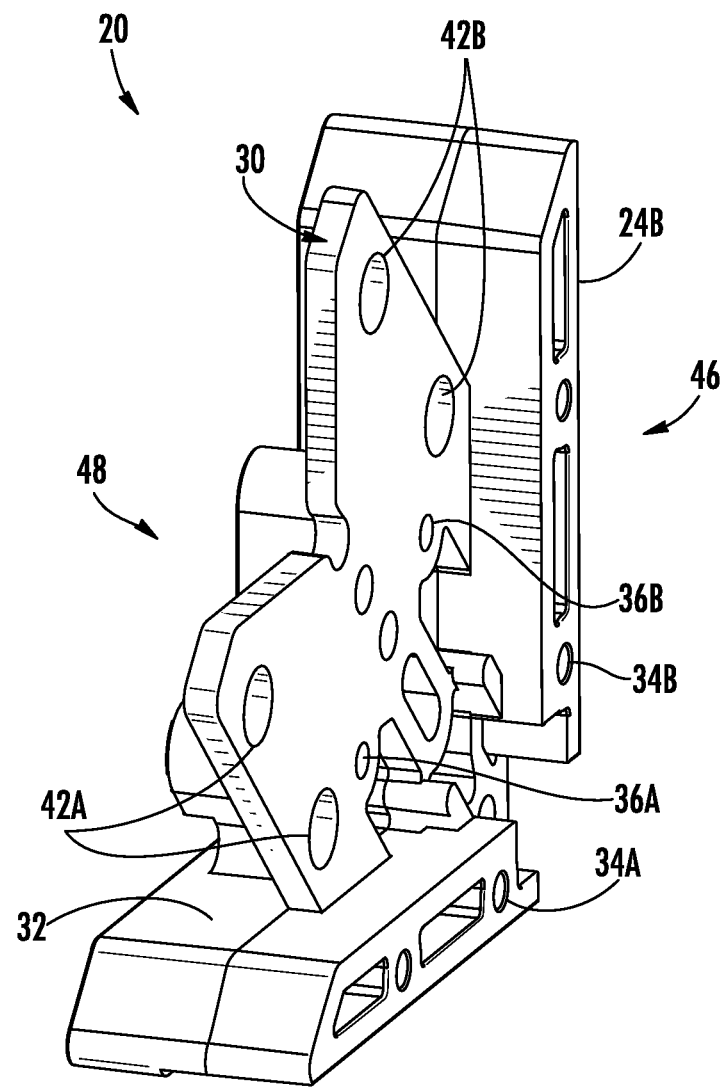
FIG. 2 is a second perspective view of the lineal connector and template.
Figure 3:
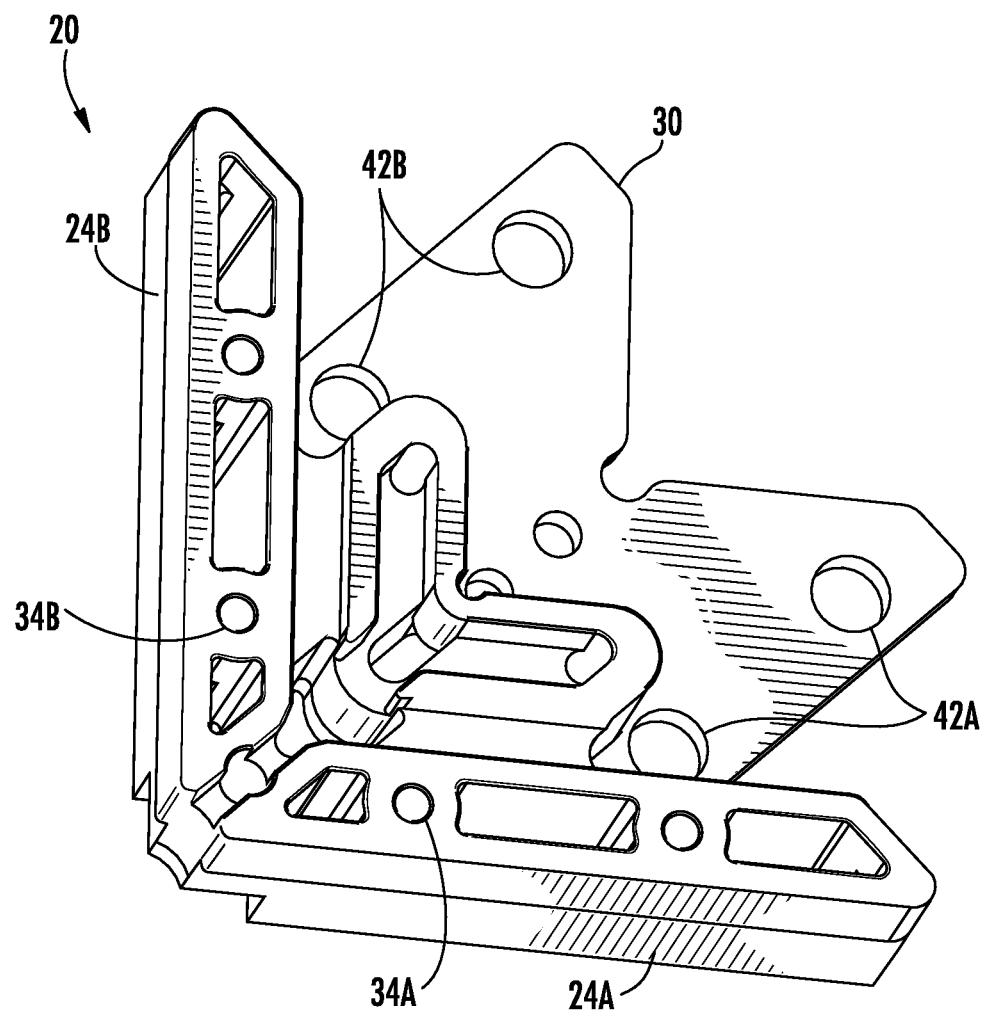
FIG. 3 is a third perspective view of the lineal connector and template.
Figure 4:
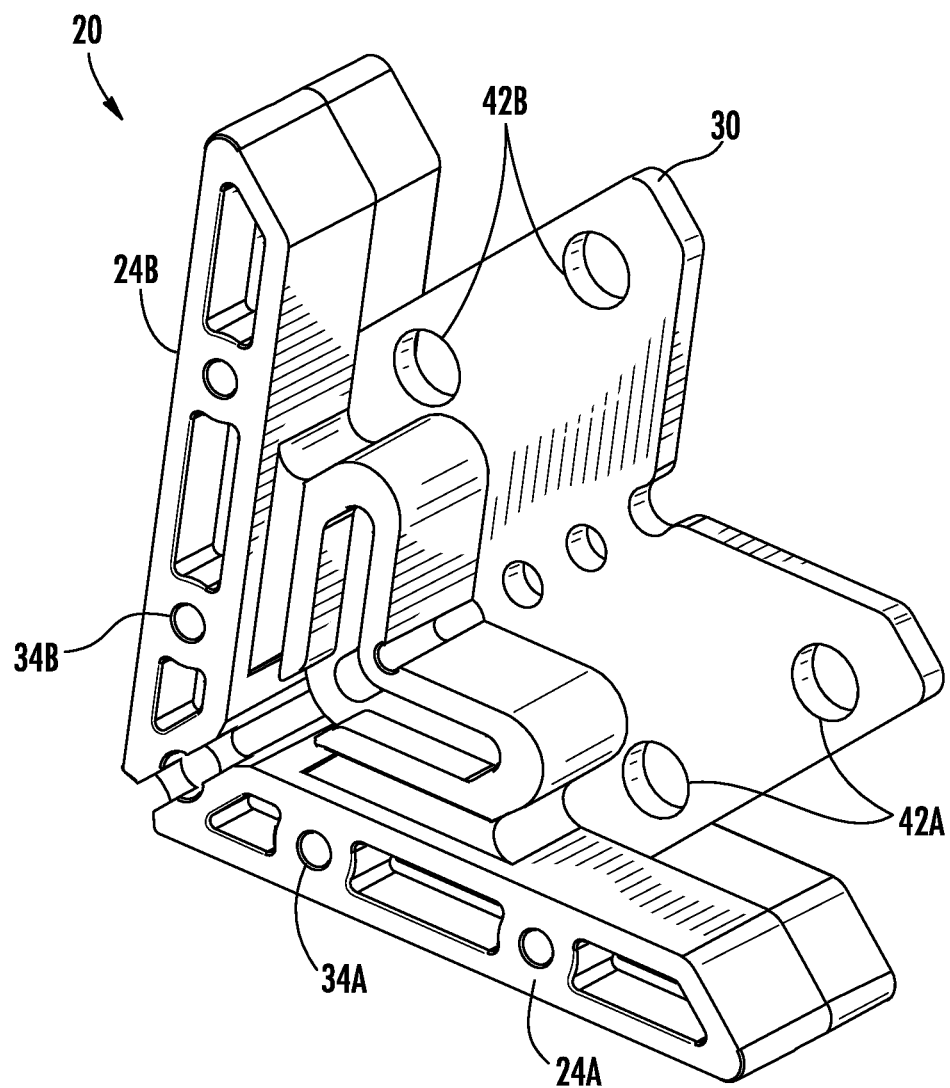
FIG. 4 is a fourth perspective view of the lineal connector and template.

As shown by FIG. 2, panel 40 is offset with respect to a centerline of member 20, being closer to side 46 than side 48 that includes extensions 26. As a result, datum surfaces on side 48 may be larger. In addition, insertion of panel 40 into the connected example lineals is facilitated. In other implementations, depending upon the interior configurations of the lineal that receive member 20, panel 40 may have other configurations and locations.

As shown by FIG. 1, panel 40 of template portion 30 further comprises connecting structures 36A, 36B (collectively referred to as connecting structures 36). Connecting structures 36 comprise one or more structures, wherein each structure is configured to interact with a corresponding assembly opening in the lineal to facilitate connection of member 20 to the lineal. The corresponding assembly opening interacted upon by each connecting structure 34 is an opening that was located using template portion 30 of the same member 20 or another identical member 20. In the illustrated example implementation, each connection structure 34 comprised a bore at least partially into, if not through, the corresponding leg 24 of member 20. In the example illustrated, each bore, serving as the connecting structure 36, is configured to receive the end of a screw fastener that also extends through the corresponding assembly opening in the lineal.

In other implementations, each connecting structure 36 may have other configurations allowing the connecting structure 36 to interact with the formed assembly opening in the lineal in other fashions. For example, instead of comprising a detent for receiving a fastener the extends through the corresponding assembly opening, each connecting structure may alternatively comprise a projection integrally formed as part of a single unitary body with panel 40, wherein the projection is received with the assembly opening to facilitate connection of the member 20 to the lineal. In one implementation, the projection may resiliently flex during insertion of member 20 into the lineal, wherein the projection, once positions across the assembly opening, flexes back outward into the assembly opening to secure the member 20 to the lineal. In one implementation, the projection may have a multi-furcated head (i.e. a bifurcated head or a head having more than two portions that flex towards one another) that resiliently flexes during insertion through the assembly opening to snap into connection with a neck of the projection received within the assembly opening and captured in place by the head that has passed through the assembly opening.

In the example illustrated, panel 40 is provided with two connection structures 36, one for each of the two lineal receiving panel 41 lineal czar joined to one another by member 20. In other implementations, panel 40 may be provided with a greater number of such connecting structures 36. In some implementations, panel 40 may include a diversity of different types of connecting structure configurations on the same panel 40.

Template openings 42 comprise openings through panel 40 that are located relative to or based upon the locations of datum surfaces 32, 34 and 44 to locate or guide the formation of assembly openings in a lineal when the lineal is abutting datum surfaces 32, 34 and 44. Subsequently, when the lineal with the formed assembly openings are joined by member 20 and receive member 20, the assembly opening will be in sufficient alignment (or have a sufficient degree of overlapping) with connecting structures 34 for connection of the member 20 to the lineals. In the example illustrated, template openings 42 comprise two parallel pairs of openings (a first pair of openings 42A and a second pair of openings 42B), each pair located along a different line extending at an angle of 45 degrees with respect to datum surfaces 32 of legs 24. In other implementations, depending upon the joint or angle between the lineal to be connected by member 20, such template openings 42 may have other relative locations. Although template portion 30 is illustrated as including four total template openings 42, two template openings 42 for forming two assembly openings in each of the two lineals being connected, in other implementations, template portion 30 may include a greater or fewer of such template openings 42.

Although the example template portion 30 is illustrated as including circular template openings through which a drill or laser may be positioned to form the assembly opening in the adjacent lineal or through which the lineal may be marked for subsequent formation of the assembly openings, in other implementations, template openings 42 may have other configurations. For example, template openings may alternatively comprise intersecting slots forming a cross-hair through which the adjacent lineal may be marked for the subsequent formation of assembly openings. In yet other implementations, template openings 42 may have other configurations. In some implementations, template portion 30 may itself include marking devices (in lieu of openings 42) which mark the locations for the assembly openings on the lineals.

Figure 5:
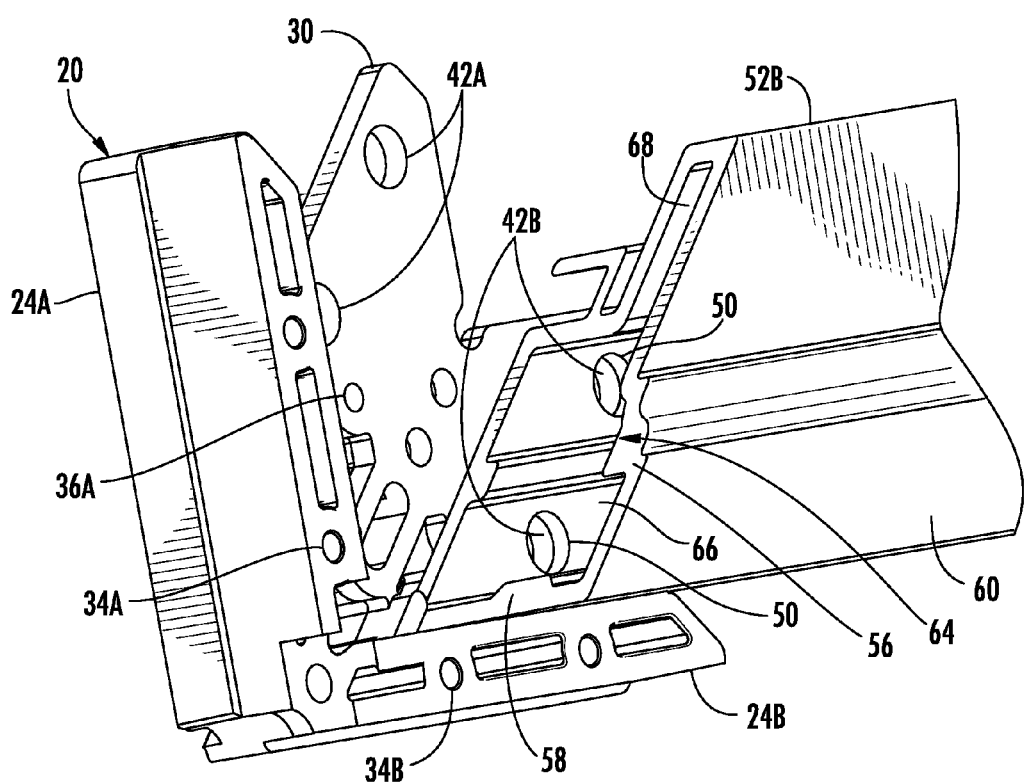
FIG. 5 is a perspective view illustrating formation of assembly openings in an example lineal using the example lineal connector and template.

FIG. 5 illustrates the use of member 20 as a template to facilitate the formation of assembly openings 50 in lineal 52B. As shown by FIG. 5, lineal 52B comprises a hollow elongate frame member having an angled end 56, a bottom wall 58, side walls 60, 62 and an interior 64 with a lower cavity 66 and an upper cavity 68. In the example illustrated, angled end 56 is at a 45 degree angle for forming a miter joint with another lineal. In other implementations, end 56 may extend at other angles such as a 90 degree angle when forming a butt joint.

To form assembly openings 50 in lineal 52, bottom wall 58 is positioned against datum surface 38 of leg 24B with side wall 62 positioned against datum surface 44 of template portion 30. At the same time, the lower edge of end 56 is positioned against datum surface 38 of extension 26B. While lineal 52B is positioned against all three datum surfaces, a drill or other material removal device is guided by template openings 42B into lineal 52 to form assembly openings 50 in wall 62. To similarly form assembly openings 50 in lineal 52A (shown in FIG. 6), the lineal 52A, which is identical to lineal 52B but for its angled end, is similarly positioned against datum surface 32 of leg 24A, against datum surface 44 and against datum surface 38 of extension 24A while template openings 42A are used to guide and locate a drill or other material removal device into lineal 52A.

Figure 6:
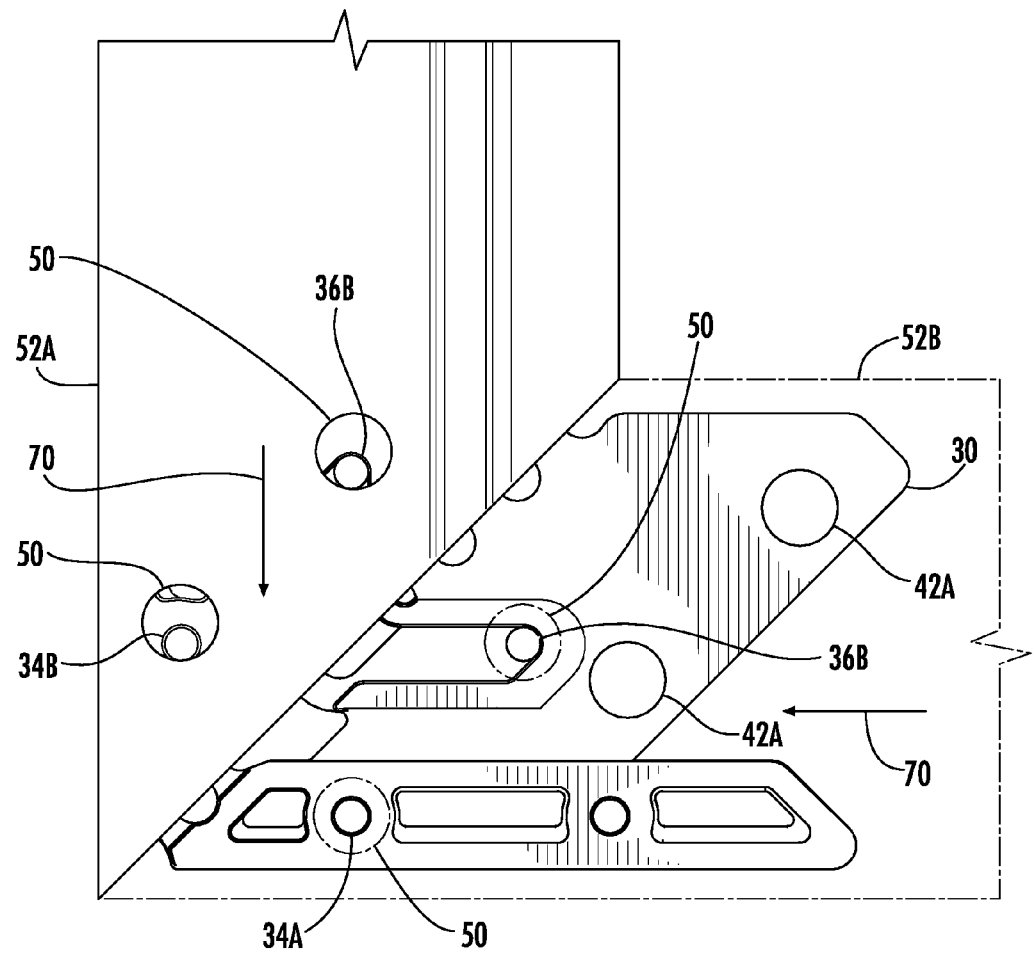
FIG. 6 is an elevational view of the example lineal connector and template connecting lineals (one of which is shown in broken lines) to form a miter joint.

FIG. 6 illustrates the use of member 20 as a connector joining lineal 52A and 52B (shown in broken lines to illustrate the reception of member 20 in lineal 52B). To assemble the example miter joint using lineal 52A, 52B, a portion of member 20 is concurrently positioned within the interior 64 of each of lineal 52A, 52B. In particular, the larger lower cavity 66 of lineal 52B receives leg 24B while lower cavity 66 of lineal 52A received leg 24A of lineal 52A. Likewise, the off-center upper cavity 68 of each of lineals 52A, 52B receives an end portion of panel 40 of template portion 30. As a result, member 20 is entirely received within and concealed by lineal 52A, 52B. Member 20 further serves as an interlocking key, guiding lineal 52A, 52B into proper positioning and alignment with respect to one another.

As shown by FIG. 6, in the example implementation, template openings 42 are arranged with respect to datum surfaces 34 and 36 such that the assembly openings 50 formed using such template openings 42 will be offset from the connecting structures in member 20 when member 20 is connecting lineals 52A, 52B. By offsetting the centerlines of assembly openings 50 relative to the centerlines of bores of connecting structures 34, lineals 52 may be further drawn tightly towards and against one another as indicated by arrows 70 with the tightening of fasteners, such as screws, within openings 50 and within the bores of connecting structures 34.

Figure 7:
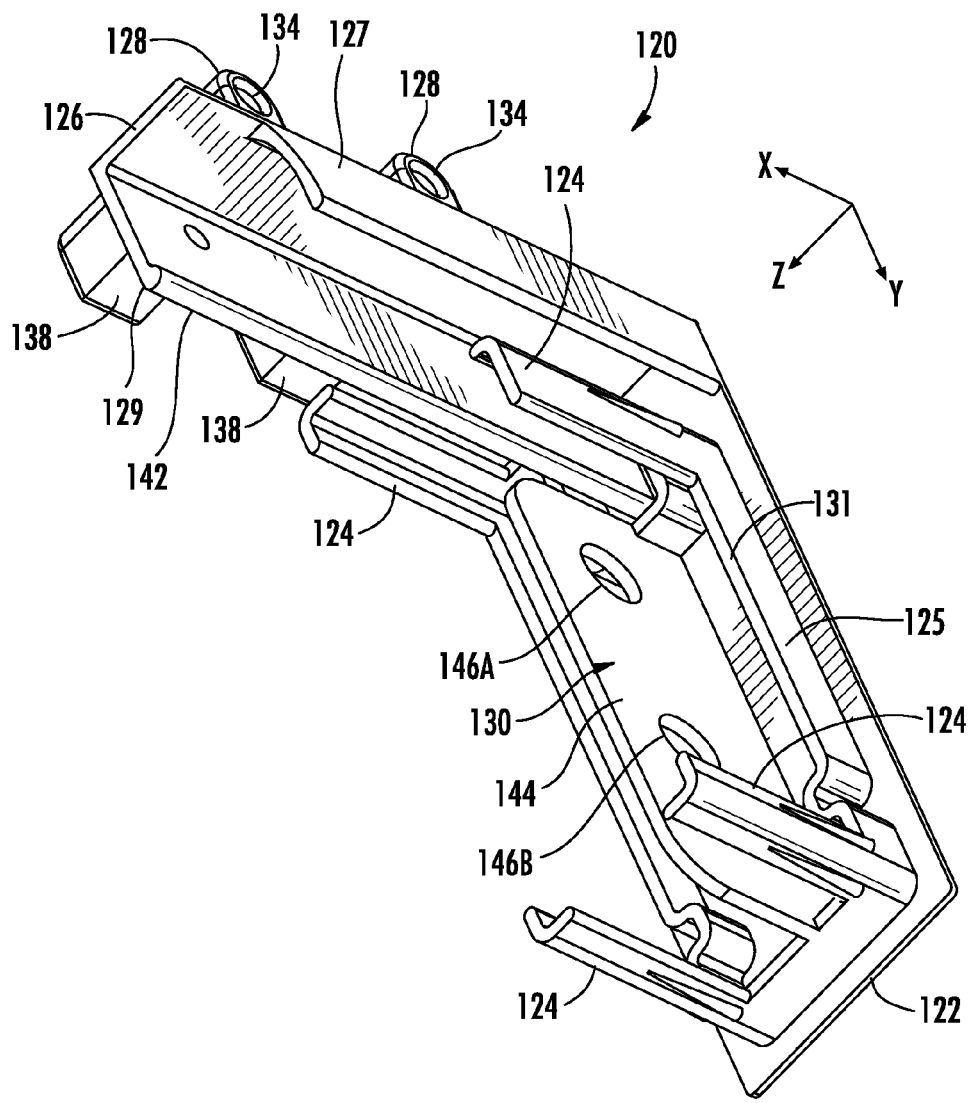
FIG. 7 is a first perspective view of another example implementation of the lineal connector and template of FIG. 1.
Figure 8:
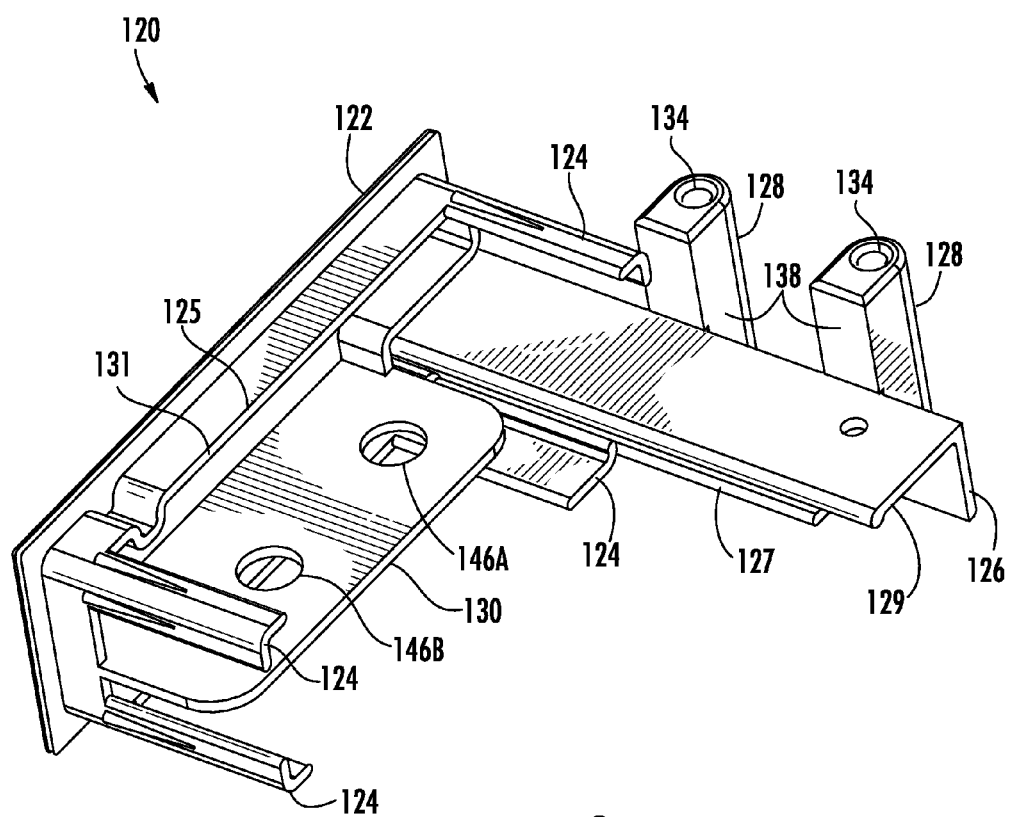
FIG. 8 is a second perspective view of the lineal connector and template of FIG. 7.
Figure 9:
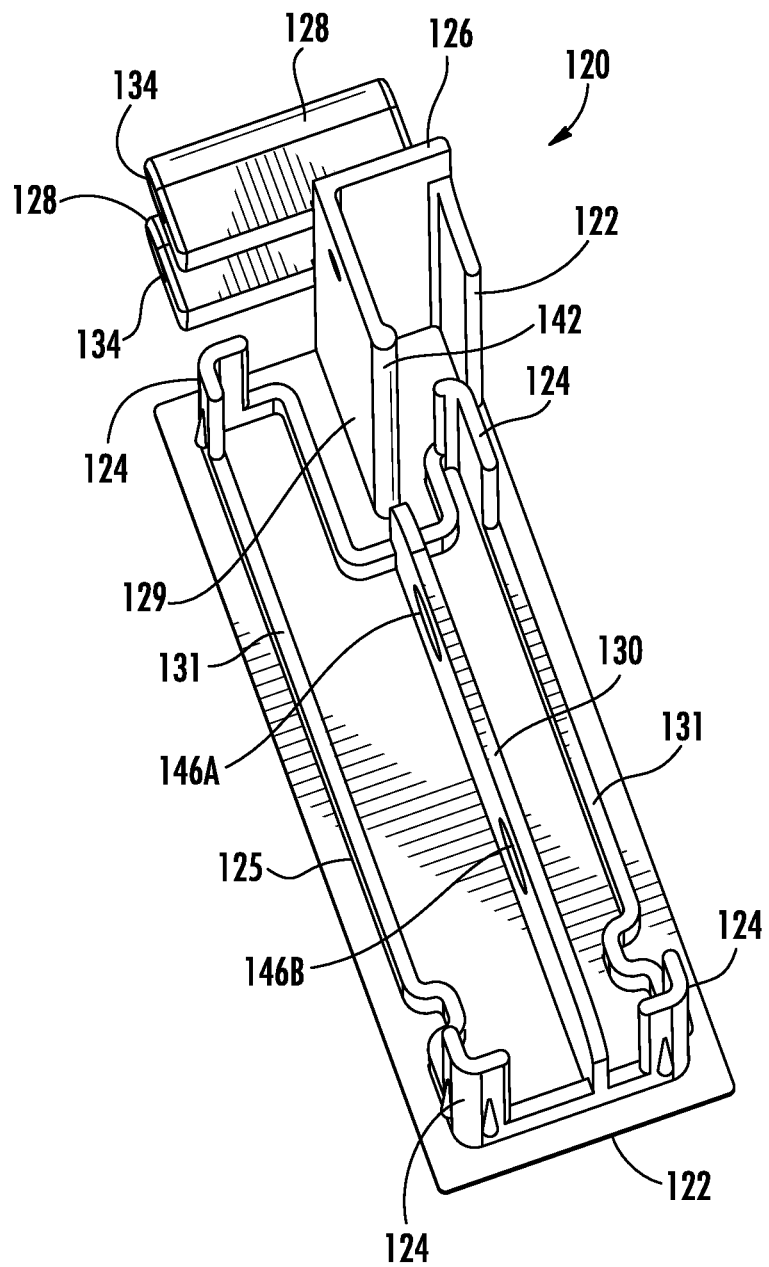
FIG. 9 is a third perspective view of the lineal connector and template of FIG. 7.

FIGS. 7-9 illustrate template and connector member 120, another implementation of member 20. Connector member 120 is similar to member 20 in that member 120 also serves the dual purpose of (1) a template for forming holes in a lineal and (2) a connector or key for aligning and joining two lineals as part of a frame. Unlike member 20, member 120 also serves as a cap for capping an open interior of a lineal.

Connector member 120 comprises cover 122, legs or corner posts 124, ribs 125, platform 126, side wall 127, datum beams 128, interlocking wall 129 and template portion 130. Cover 122 comprises a panel shaped and sized to extend across and cap the hollow interior end of a lineal. Although illustrated as a rectangular panel, in other implementations, cover 122, may have other shapes and sizes depending upon the shape and size of the end of the lineal being capped.

Figure 17:
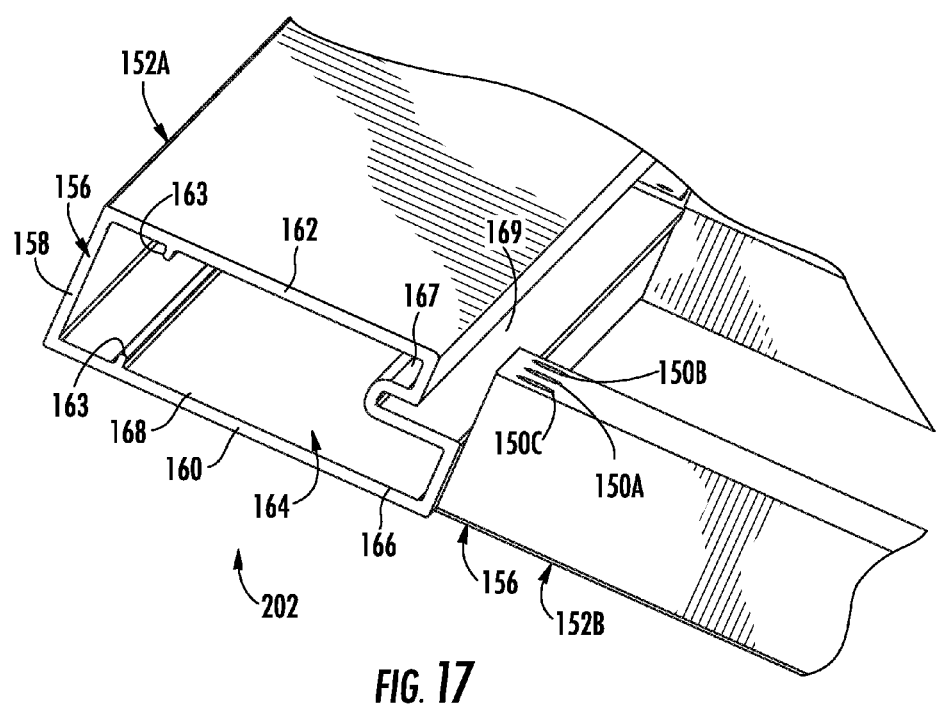
FIG. 17 is an enlarged fragmentary perspective view of the butt joint of FIG. 16 with the example lineal connector and template omitted.

Corner posts 124 comprise posts extending from cover 122 perpendicular to cover 122. Posts 124 project from cover 122 into an interior of the lineal being capped. Posts 124 engage each of the interior corners of the lineal. In the example illustrated in which the lineal has an elevated corner (as seen in FIG. 17), member 120 has a corresponding elevated leg 124. In other implementations, the arrangement and number of legs may vary depending upon the internal configuration of the lineal being capped and connected.

Ribs 125 extend between corner posts 124. In addition to strengthening corner posts 124, ribs 125 provide datum surfaces 131 along their edges that serve to locate a lineal with respect to template portion in the X axis direction. In other implementations, such datum surfaces 131 may be provided by other structures of member 120.

Platform 126 comprises a wall extending from cover 122 for supporting datum connectors 128 as well as side wall 127 and interlocking wall 129. Side wall 127 comprises a wall suspended from platform 126 along an outer perimeter of member 120. Side wall 127 extends flush with a side of the lineal to provide a flush back face at the junction of the connected lineals.

Datum beams 128 facilitate the location of template portion 130 on a first lineal being capped while also facilitating the connection of member 120 to a second lineal being joined to the capped lineal. In the example illustrated, beams 128 each provide a connecting structure 134 and a datum surface 138. Connecting structure 134 comprises a structure that is configured to interact with a corresponding assembly opening in the lineal to facilitate connection of member 120 to the lineal. The corresponding assembly opening interacted upon by each connecting structure 134 is an opening that was located using template portion 30 of the same member 120 or another identical member 120. In the illustrated example implementation, each connection structure 134 comprised a bore at least partially into, if not through, the corresponding beam of datum beam 128. In the example illustrated, each bore, serving as the connecting structure 134, is configured to receive the end of a screw fastener that also extends through the corresponding assembly opening in the lineal.

In other implementations, each connecting structure 134 may have other configurations allowing the connecting structure 134 to interact with the formed assembly opening in the lineal in other fashions. For example, instead of comprising a detent for receiving a fastener the extends through the corresponding assembly opening, each connecting structure may alternatively comprise a projection integrally formed as part of a single unitary body with the beam of beam 128, wherein the projection is received with the assembly opening to facilitate connection of the member 120 to the lineal. In one implementation, the projection may resiliently flex during insertion of member 120 into the lineal, wherein the projection, once positions across the assembly opening, flexes back outward into the assembly opening to secure the member 120 to the lineal. In one implementation, the projection may have a multi-furcated head (i.e. a bifurcated head or a head having more than two portions that flex towards one another) that resiliently flexes during insertion through the assembly opening to snap into connection with a neck of the projection received within the assembly opening and captured in place by the head that has passed through the assembly opening.

In the example illustrated, platform 126 is provided with two spaced beams 128 with associated connecting structures 134. In other implementations, each beam 128 may be provided with a greater or fewer of such connecting structures 134. In some implementations, member 120 may include a single beam including multiple connecting structures 134. In some implementations, beams 128 may include a diversity of connecting structure configurations on the same beam 128 or amongst several beams 128.

Datum surfaces 138 comprise surfaces to locate template portion 130 relative to an adjacent lineal for forming an assembly opening. As will be described hereafter, surfaces 138 engage a surface of the lineal such that the template portion 130 is appropriately positioned with respect to the lineal in the negative Y axis. In other implementations, other surfaces may be provided to serve as datums for locating template portion 130 relative to the lineal for forming assembly openings.

Interconnecting wall 129 comprises a wall or flange suspended from platform 126 for projecting into a corresponding channel feature in the lineal being capped. Wall 129 facilitates correct alignment and connection of member 120 to the lineal. In addition, wall 129 further provides datum surface 142 along its lower edge. Surface 142 serves as an alternative to datum surface 138 to form an alternative assembly opening for a different connection arrangement as will be described hereafter. In some implementations, surface 142 may be omitted or may be provided by other structures of member 120.

Template portion 130 comprises a structure providing a template for forming at least one assembly opening in a lineal, wherein the assembly opening located by portion 130 facilitates connection to the member 120. In the example illustrated, template portion 130 is integrally formed as a single unitary body with cap 122 and extends between corner posts 124. Template portion 130 is sized and located so as to be entirely received with and concealed by the lineal being capped. In the example implementation, template portion 130 comprises a flat panel 144 and template openings 146A, 146B (collectively referred to as template openings 146).

Template openings 146 comprise openings through panel 144 that are located relative to or based upon the locations of datum surfaces 131, 138 and 142 to locate or guide the formation of assembly openings in a lineal when the lineal is abutting datum surfaces 131, 138 and 142. Subsequently, when the lineal with the formed assembly openings are joined by member 120 and receive member 120, the assembly opening will be in sufficient alignment (or have a sufficient degree of overlapping) with connecting structures 134 for connection of the member 120 to the lineals.

In the example illustrated, template openings 146 comprise a pair of openings arranged along a line parallel to cover 122. Although template portion 130 is illustrated as including two template openings 146, in other implementations, template portion 130 may include a greater or fewer of such template openings 146.

Although the example template portion 130 is illustrated as including circular template openings through which a drill or laser may be positioned to form the assembly opening in the adjacent lineal or through which the lineal may be marked for subsequent formation of the assembly openings, in other implementations, template openings 146 may have other configurations. For example, template openings may alternatively comprise intersecting slots forming a cross-hair through which the adjacent lineal may be marked for the subsequent formation of assembly openings. In yet other implementations, template openings 146 may have other configurations. In some implementations, template portion 130 may itself include marking devices (in lieu of openings 146) which mark the locations for the assembly openings on the lineals.

FIG. 10 illustrates the use of member 120 as a template to facilitate the formation of assembly openings 150A, 150B in lineal 152B. As shown by FIG. 17 which illustrates two adjacent lineals 152A, 152B without an interconnecting member 120, lineals 152A, 152B each comprises a hollow elongate frame member having an end 156, a top wall 158, side walls 160, 162, alignment projections or 163 and an interior 164 with a lower elongated cavity 166, and lower shorten cavity 167 and an upper cavity 168.

As shown by FIG. 10, to form assembly openings 150A, 150B in lineal 152B, top wall 158 is positioned against datum surface 138 with side wall 162 positioned against datum surface 142 of wall 129. At the same time, the edges of wall 162 are positioned against datum surfaces 131 with one of posts 124 extending in the recess 169 (shown in FIG. 17) below cavity 167. While lineal 152B is positioned against all three datum surfaces, a drill or other material removal device is guided by template openings 146A, 146B into lineal 152B to form assembly openings 150A, 150B in wall 162.

FIG. 11 illustrates an alternative positioning of member 120 against lineal 152B performing an additional or alternative assembly opening 150C in wall 162. As shown by FIG. 11, to similarly form assembly opening 150C in lineal 152B member 120 is repositioned and shifted upwardly such that one of the two posts 124 proximate projections 138 our position within cavity 164. Wall 158 positioned against datum surface 142 of wall 129. As in FIG. 10, edges of wall 162 are positioned against datum surfaces 131 while template opening 146A is used to guide and locate a drill or other material removal device into lineal 152B to form opening 150C in a situation where opening 150A has not been previously formed, a drill or other material removal device may be located by template opening 146B to also form assembly opening 150A. Although FIG. 11 illustrates the previous formation of assembly opening 150B from the step shown in FIG. 10, in circumstances where assembly opening 150B will not be used (depending on the particular joint), the formation of assembly opening 150B may be omitted. In the example illustrated in which assembly openings 150A and 150B are illustrated as being previously formed for the step illustrating FIG. 10, template opening 146B automatically aligns with the previously formed access opening 150A when in the position shown in FIG. 11. In such an implementation, datum service 142 may alternatively be omitted, where such alignment previously provided by datum surface 142 is alternatively provided by the alignment of template opening 146B with the previously formed assembly opening 150A.

Figure 12:
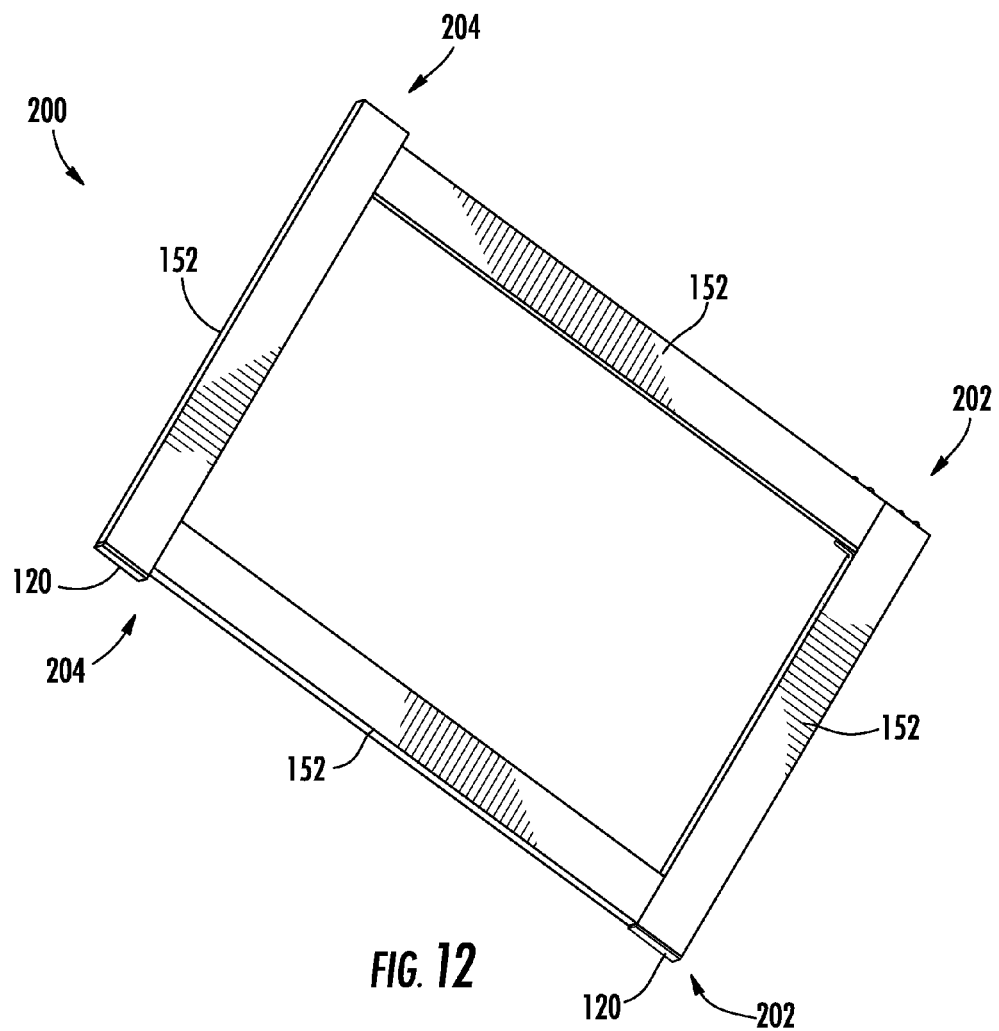
FIG. 12 is a perspective view of a front of an example frame formed using the lineal connector and template of FIG. 7.
Figure 13:
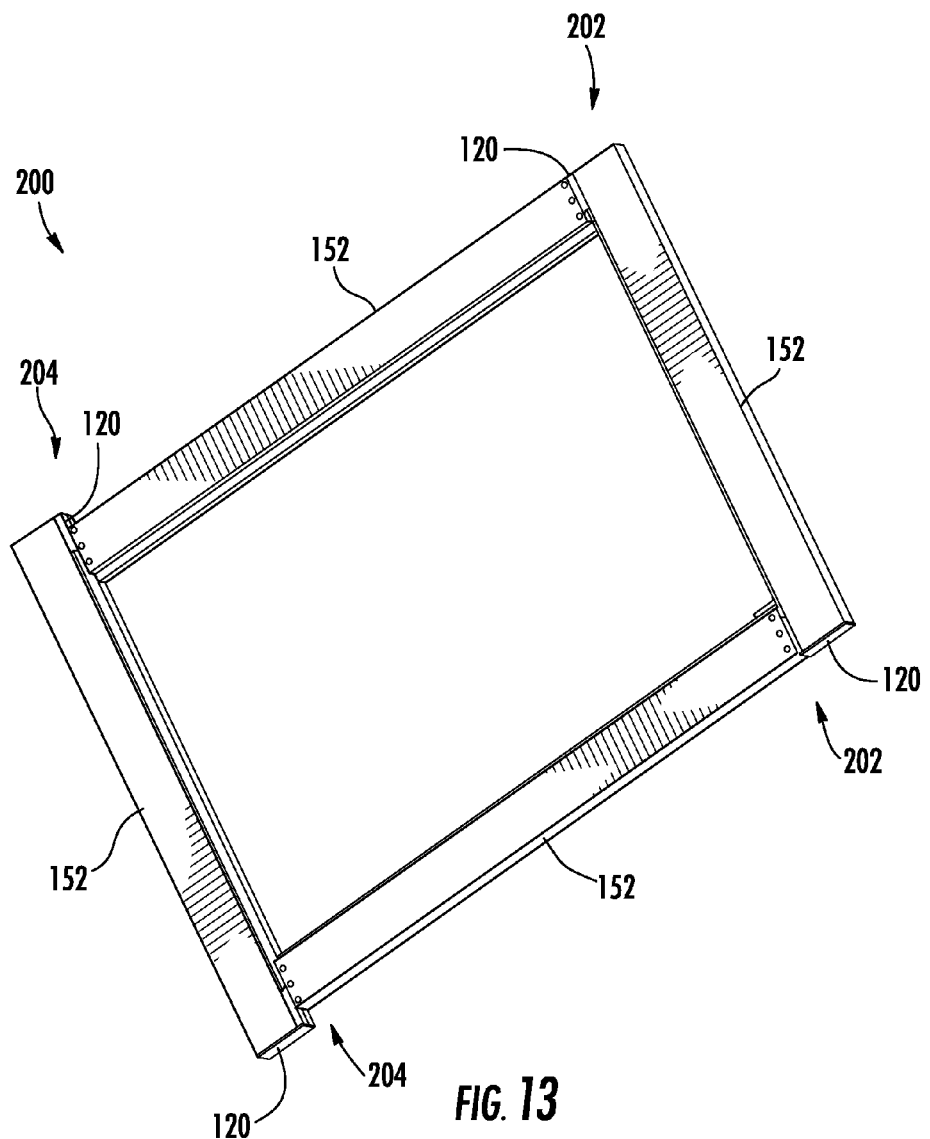
FIG. 13 is a perspective view of a rear of the example frame of FIG. 12.

FIGS. 12 and 13 illustrate an example of a frame 200 formed by four lineals 52 joined by members 120. FIG. 12 illustrates a front of frame 200. FIG. 13 illustrates the rear of frame 200. The example frame 200 comprises a pair of butt joints 202 and a pair of bull nose joints 204.

Figure 14:
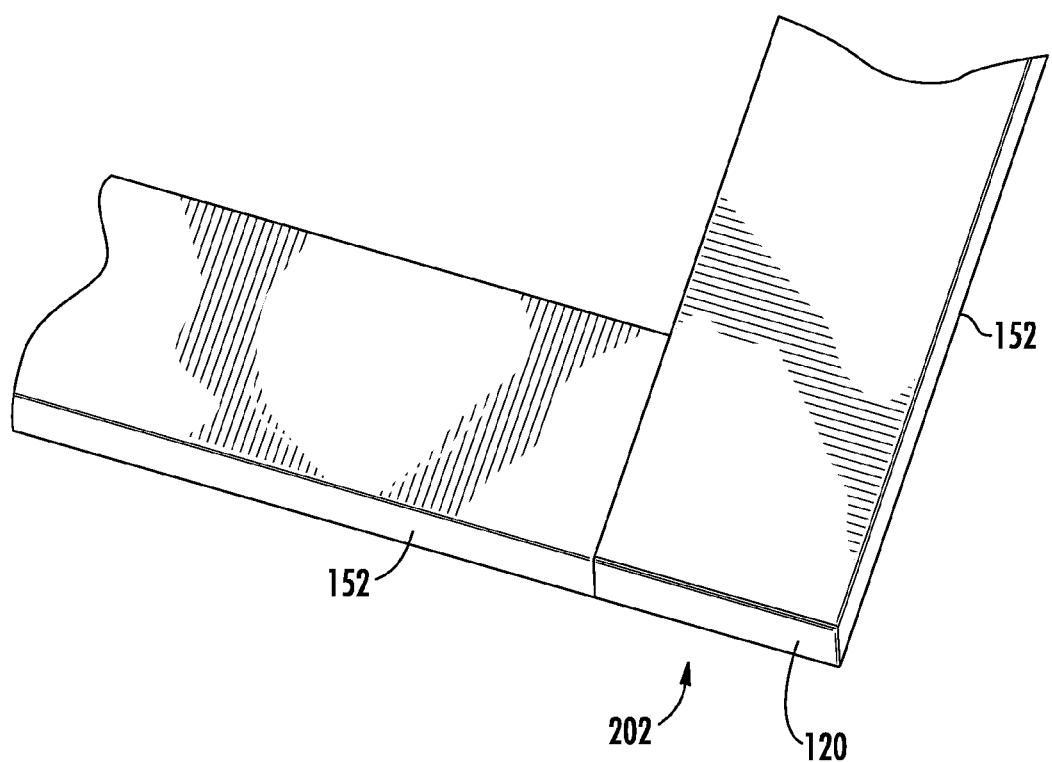
FIG. 14 is an enlarged fragmentary perspective view of a front of a butt joint of the frame of FIG. 12.
Figure 15:
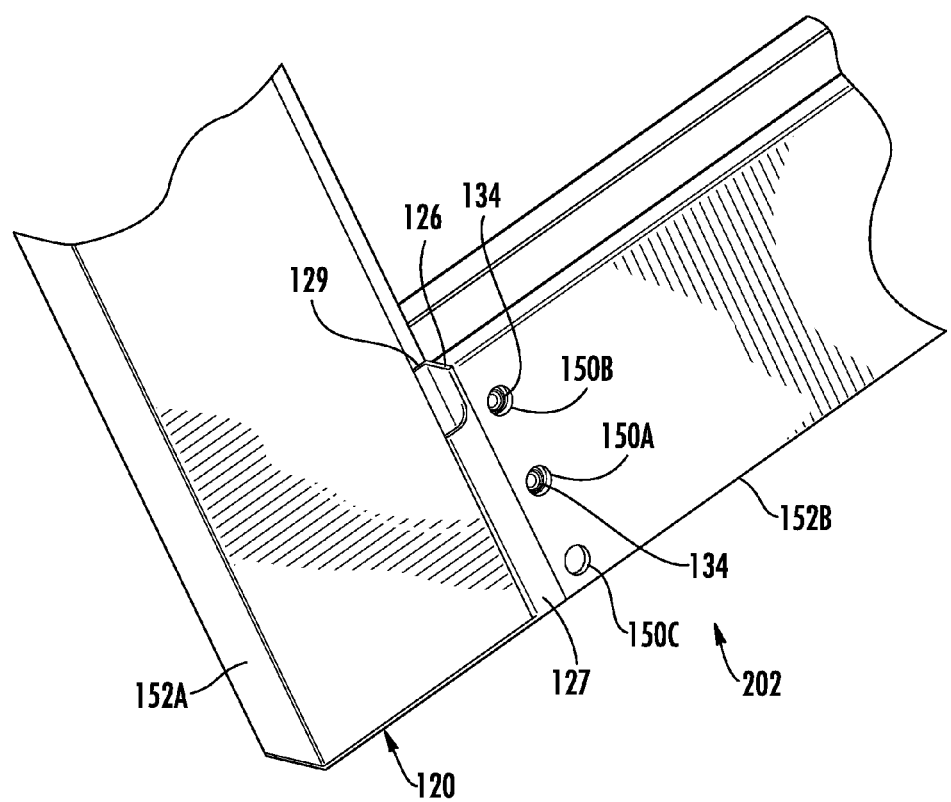
FIG. 15 is an enlarged fragmentary perspective view of a rear of the butt joint of FIG. 14.
Figure 16:
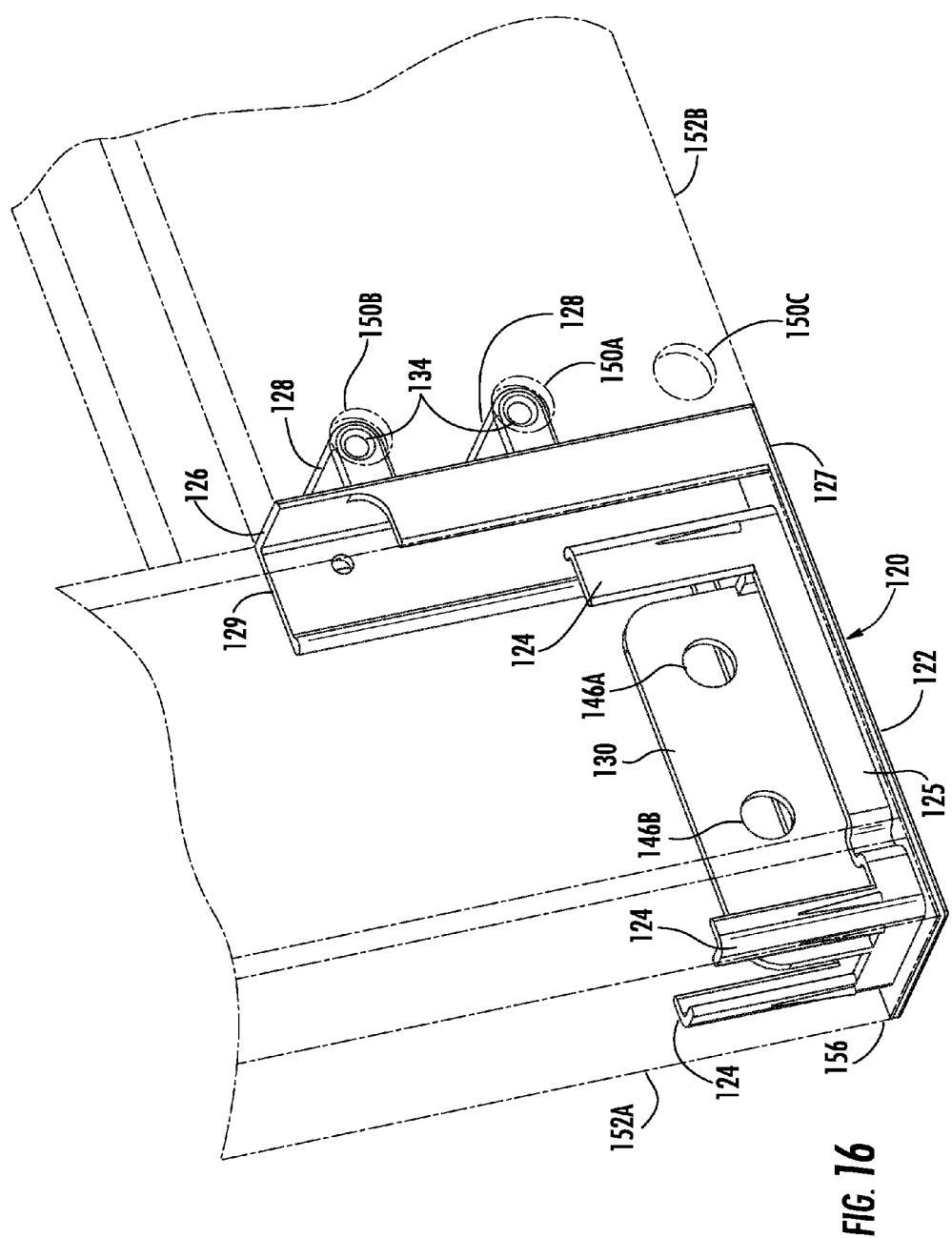
FIG. 16 is an enlarged fragmentary perspective view of the rear of the butt joint shown in FIG. 15 with lineal being transparently shown with broken lines.
Figure 18:
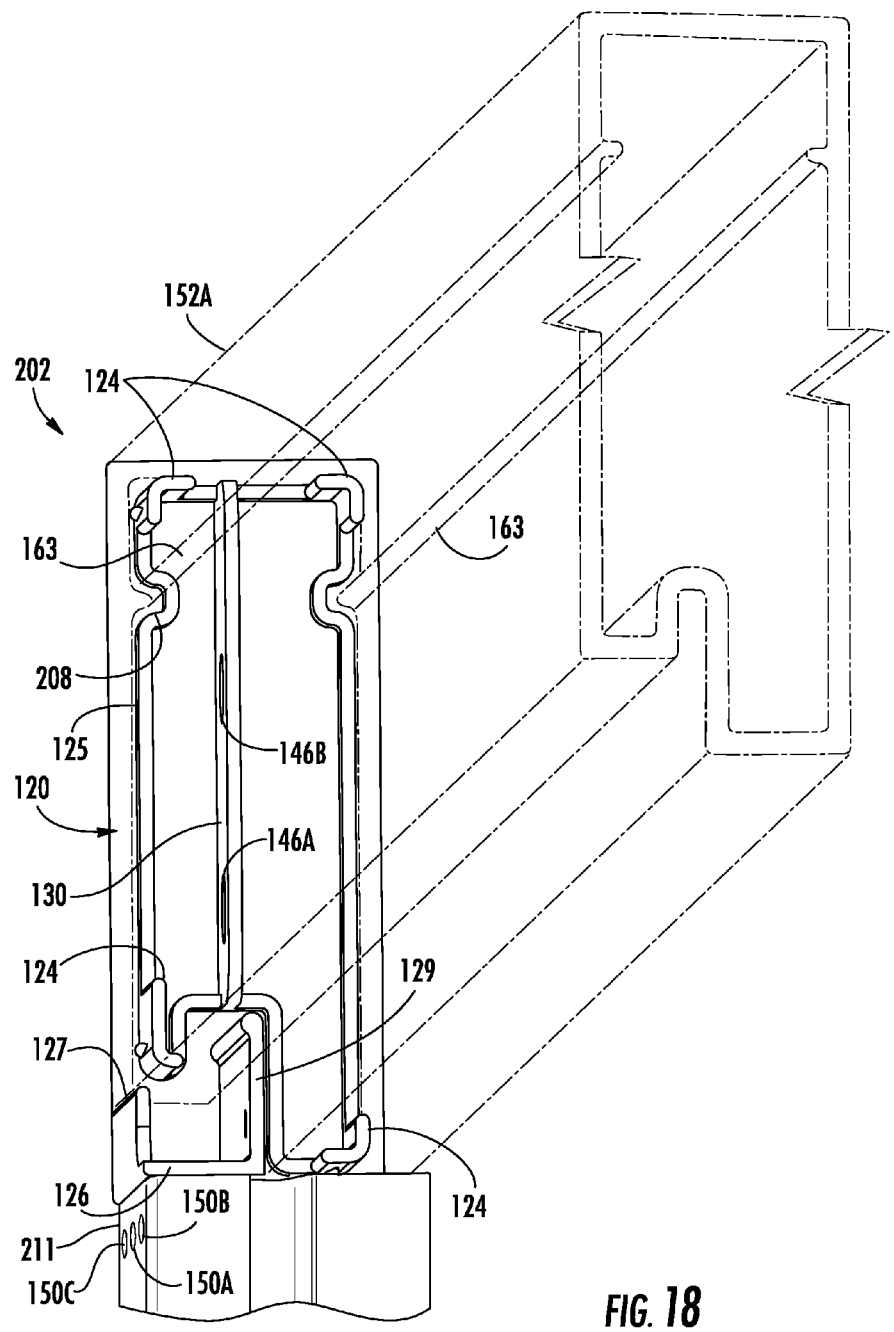
FIG. 18 is an enlarged fragmentary perspective view of the butt joint of FIG. 12 illustrating capping of the lineal with the example lineal connector and template.

FIGS. 14-18 illustrate one of butt joints 202 in more detail. FIG. 14 provides a close-up perspective view of a front of butt joint 202 while FIG. 15 provides a close-up perspective view of a rear of the butt joint 202. FIG. 16 illustrates the rear perspective view of butt joint 202 with lineals 152A, 152B transparently illustrated with broken lines. FIG. 17 illustrates the rear perspective view of butt joint 202 with member 120 removed. FIG. 18 transparently illustrates member lineal 152A to illustrate the capping of lineal 152A by member 120.

As shown by FIGS. 16 and 18, when interconnecting lineals 152A and 152B, member 120 caps the open end 156 of lineal 152A. Each of posts 124 extend into cavity 164 at corners of lineal 152A. Ribs 125 form recesses 208 for receiving projections 163. Wall 129 extends along recess 169 outside of cavity 164, wherein sidewall 127 extend substantially flush with the exterior of wall 162. Template portion 130 is completely received within cavity 164. Platform 126 abuts end 211 of lineal 152B. As shown by FIG. 16, datum beans 128 extend or project from platform 126 into cavity 164 of lineal 152B with connecting structures 134 aligned with assembly openings 150A and 150B for the reception of fasteners (not shown) to connect lineal 152A and 152B. As noted above, in other implementations, connecting structures 134 may have other configurations to interact with assembly openings 150A and 150B to connect lineals 152A and 152B. In the example illustrated in FIG. 16, the formed access opening 150C is not utilized. In such implementations, assembly opening 150C may be omitted.

Figure 19:
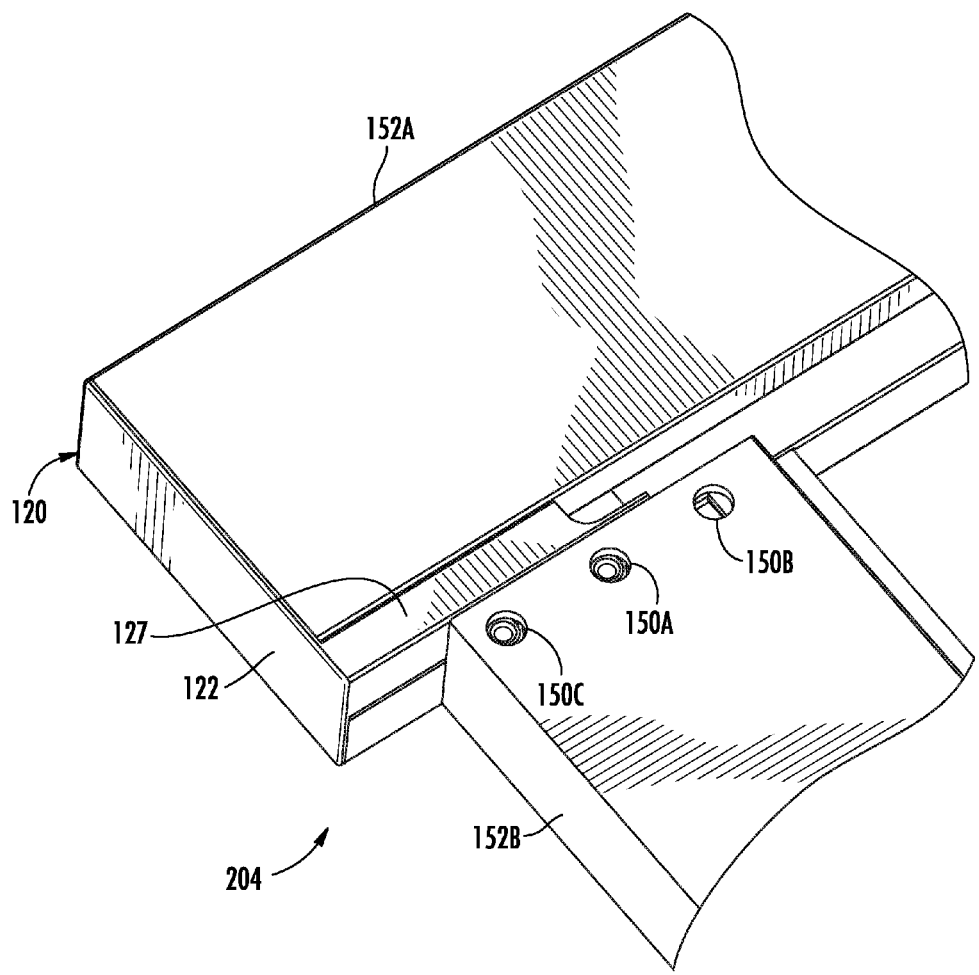
FIG. 19 is an enlarged fragmentary perspective view of a rear of a bull nose joint of the frame of FIG. 12.

FIG. 19 is a rear perspective view of an example joint 204. Joint 204 is formed using the same lineals 152A and 152B and the same member 120. Member 120 caps the end of lineal 152A as described above with respect to joint 202. However, rather than datum beams 138 being aligned with assembly openings 150A and 150B (as described previously to form a butt joint 202), datum beans 138 are positioned to align connecting structures 134 with assembly openings 150A and 150C (previously formed by member 120 in lineal 152B). Although not shown, fasteners passed through the aligned assembly openings and connecting structures to join and fasten lineals 152A and 152B together. As noted above, in other implementations, connecting structure 134 may have other configurations to facilitate fastening or connection of lineals 152A and 152B.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a first elongate frame member having a first hollow portion including a first assembly opening;
   a second elongate frame member having a second hollow portion including a second assembly opening; and
   a connector member comprising:
      a template portion including an opening providing a template for forming at least one of the first and second assembly openings;
      a connector portion adjacent the template portion comprising:
         at least two legs, each having a datum surface to contact a respective surface of the first elongate frame member or the second elongate frame member in a first configuration to locate the template opening with the first elongate frame member or the second elongate frame member, respectively, to facilitate formation of the first assembly opening and the second assembly opening in the respective first elongate frame member and the second elongate frame member; and
      at least one connecting structure to interact with the at least one of the first and second assembly opening to facilitate connection of the connector member to the first and second elongate frame members, wherein the at least one connecting structure is located so as to be aligned with one of the first and second assembly openings but offset with respect to a center of the respective assembly opening in a second configuration where the member is positioned within the hollow portion of the first elongate frame member and the hollow portion of the second elongate frame member.

2. The apparatus of claim 1, wherein the at least one connecting structure comprises a bore into a leg of the at least two legs of the connector member to receive a fastener.

3. The apparatus of claim 2, wherein the bore is to be received within the hollow portion of at least one of the first elongate frame member and second elongate frame member when the connector member is connected to one of the first elongate frame member and second elongate frame member.

4. The apparatus of claim 2, wherein the at least one template opening comprises a plurality of template openings and wherein the at least one connecting structure comprises a plurality of bores to receive a plurality of fasteners.

5. The apparatus of claim 1, wherein the datum surfaces comprise a first datum surface facing in a first direction, a second datum surface facing a second direction perpendicular to the first direction and a third datum surface facing in a third direction oblique to the first direction and the second direction.

6. The apparatus of claim 1, wherein the datum surfaces comprise a first datum surface facing in a first direction, a second datum surface facing a second direction perpendicular to the first direction and a third datum surface facing in a third direction perpendicular to the first direction and the second direction.

7. The apparatus of claim 1, wherein the connector member is configured to be received within the hollow portion of the first elongate frame member and the hollow portion of the second elongate frame member abutting the first elongate frame member along a 45 degree joint line.

8. The apparatus of claim 1, further comprising a cover to cap an open end of the first lineal.

9. The apparatus of claim 1, wherein the connector member is configured to be completely concealed within the first elongate frame member and the second elongate frame member when the first elongate frame member and the second elongate frame member are connected by the connector member.

* * * * *